United States Patent [19]

Stevens

[11] Patent Number: 4,789,563

[45] Date of Patent: Dec. 6, 1988

[54] SOL GEL FORMATION OF POLYSILICATE, TITANIA, AND ALUMINA INTERLAYERS FOR ENHANCED ADHESION OF METAL FILMS ON SUBSTRATES

[75] Inventor: Ward C. Stevens, New Fairfield, Conn.

[73] Assignee: Advanced Technology Materials, Inc., New Milford, Conn.

[21] Appl. No.: 154,982

[22] Filed: Feb. 11, 1988

Related U.S. Application Data

[62] Division of Ser. No. 912,964, Sep. 26, 1986, Pat. No. 4,738,896.

[51] Int. Cl.$^4$ .................... B05D 3/02; B05D 1/36; B05D 7/00; C23C 16/00
[52] U.S. Cl. .................... 427/252; 427/397.7; 427/404; 427/419.2
[58] Field of Search .................... 427/252, 347.7, 404, 427/419.2

[56] References Cited

U.S. PATENT DOCUMENTS 4,297,246 10/1981 Cairns .................... 208/48 R
4,614,673 9/1986 Bendig .................... 427/376.2
4,636,440 1/1987 Jada .................... 427/376.2 X Primary Examiner—Michael Lusignan
Attorney, Agent, or Firm—Steven J. Hultquist

[57] ABSTRACT

A metal-coated substrate, e.g., of glass, ceramic, or a hydroxy-functionalized material, wherein the improvement comprises a polysilicate, titania, or alumina interlayer between the substrate and the metal coating. The interlayer may have a porous microstructure, e.g., a polysilicate interlayer with an average pore size on the order of 50-150 Angstroms.

Such articles, e.g., in the form of metal-coated fibers, may suitably be employed as reinforcing media in material composites having utility in structural applications, such as EMI shielding elements.

Also disclosed is a corresponding method for forming a metal coating on a substrate by the provision of an interlayer of the above type. The interlayer may suitably be formed by applying to the substrate a sol gel dispersion of the polysilicate, titania, or alumina material, followed by drying of the applied dispersion.

16 Claims, 1 Drawing Sheet

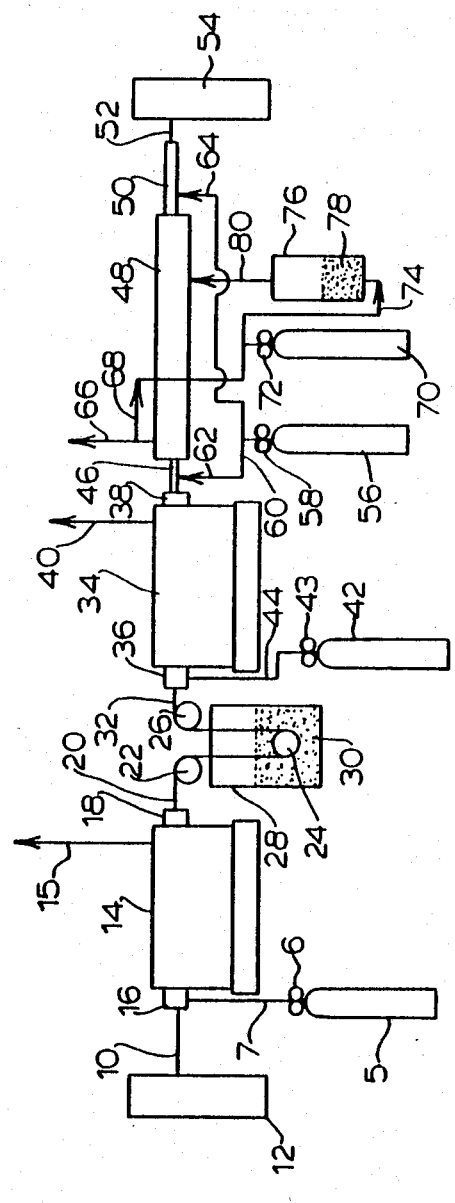

SOL GEL FORMATION OF POLYSILICATE, TITANIA, AND ALUMINA INTERLAYERS FOR ENHANCED ADHESION OF METAL FILMS ON SUBSTRATES

CROSS-REFERENCE TO RELATED APPLICATIONS

This is a division of U.S. application Ser. No. 06/912,964 filed Sept. 26, 1986, now U.S. Pat. No. 4,738,896, patented April 29, 1988. Concurrently filed with Ser. No. 06/912,964 on Sept. 26, 1986 is a related application of Ward C. Stevens, U.S. application Ser. No. 06/913,000, now U.S. Pat. No. 4,759,950, patented July 26, 1988 entitled "APPARATUS AND METHOD FOR METALLIZING FILAMENTS," and assigned to the assignee hereof.

BACKGROUND OF THE INVENTION

1. Field of the Invention

This invention relates to metal-coated substrates, and a method for their manufacture, as well as to composite material articles in which such metal-coated substrates, e.g., in the form of metal-coated fibers, may be used as reinforcing media.

2. Description of the Related Art

In a variety of applications, it is necessary and/or desirable to provide metal coatings, for example, thin films of nickel, gold, copper, silver, and the like, on various adhesion-resistant or poorly adhering substrates, such as glass and ceramics. Examples of such applications include conventional mirrors, conductive fillers, and reinforcing media.

Particularly in composite materials applications, for example in electromagnetic interference (EMI) shielding applications, where metal-coated glass fibers are employed as the discontinuous phase for reinforcement of continuous phase matrix materials (typically thermoplastic resins), it is critically important that the metal coating has a high degree of adhesion to the glass substrate.

Good adhesion of the metal coating is necessary in such applications in order that the metallic film be continuous in the final cured composite on the associated reinforcement elements (glass fibers).

Continuous metallic coatings are in turn essential in the aforementioned composites applications, since any discontinuities will lower the electrical conductivity of the composite. In general, the more highly conductive a composite is, the greater is its ability to provide effective EMI shielding.

In composite applications where the continuous phase matrix material is a thermosetting material, the presence of the metal-coated fibers therein may permit the matrix resin to be rapidly and uniformly cured by radio frequency or microwave heating of coating metal. It is apparent that the presence of discontinuities in the metal coatings on the substrate fibers will result in corresponding localized absences of the desired heating. This in turn will cause uneven curing rates in the composite, with concomitant localized stresses therein and decreased mechanical properties for the composite as a whole.

Further, the adhesion of the metal coating to the associated fiber substrate in composites applications must be satisfactory to withstand the abrading and shear to which the coated fibers are subjected in forming the composite.

Specifically, fiber-reinforced composites are typically made by dispersing the reinforcing fibers into the matrix resin with a mixing means such as a Brabender single screw extruder or a Werner-Pfleiderer twin screw extruder. During suoh dispersion, the metal coated fibers encounter substantial abrasion and shear via contact with one another. If the metal coating on the fibers is not strongly adherent in character, such contacts will propagate peeling, pitting, or other delamination of the metal coating, with the aforementioned deleterious consequences on the performance and properties of the composite.

Japanese Kokai Tokkyo Koho No. 60/189105 discloses a conductive composite material, suitable for use in electromagnetic shielding applications, which consists of a thermoplastic resin, e.g., polystyrene, containing 5–40 weight percent of a conductive filler such as copper fibers, and 0.3–10 weight percent of a material for preventing the conductivity of the composite from deteriorating, such as glass fibers coated with tin, nickel, aluminum, or the like.

Japanese Kokai Tokkyo Koho No. 60/65179 discloses the use of nickel coated glass fibers in EMI shielding composites. The nickel coated fibers are prepared by soaking them in titanium sulfate, followed by calcining to form titanium dioxide coatings. The fibers next are soaked in aqueous stannous chloride-hydrochloric acid solutions, washed, activated in aqueous palladium chloride-hydrochloric acid solution to Precipitate palladium on the fibers, and washed. Finally, the fibers are chemically plated with nickel using an aqueous solution of nickel sulfate, nickel citrate, sodium hypophosphate, sodium acetate, and ammonium chloride.

Japanese Kokai Tokkyo Koho No. 60/77151 describes electroless coating of glass fibers with conductive metal films, e.g., of nickel, copper, cobalt, iron, and alloys of nickel-copper, nickel-phosphorus, cobalt-phosphorus, cobalt-nickel-phosphorus, iron-nickel, and iron-cobalt, after sensitizing the glass substrate in an aqueous stannous chloride solution, and activated in an aqueous palladium chloride solution.

Spinning and subsequent metal coating of glass optical fiber preforms in vacuo is taught in Japanese Kokai Tokkyo Koho No. 57/156341. Disclosed metals include aluminum, nickel, and tin.

Japanese Kokai Tokkyo Koho No. 57/39284 discloses the electroless plating of glass fibers, after their immersion in an aqueous palladium nitrate solution and heat treatment, e.g., for 30 seconds at 400 degrees Centrigrade. Nickel is mentioned as an example of the electrolessly plated metal.

Schladitz U.S. Pat. Nos. 4,096,823 and 4,097,624 disclose an apparatus and method for metallizing filaments such as glass, in a two-chamber system. In the first chamber, the filament drawn therethrough is impinged with plural streams of heated inert gas to "decontaminate", i.e., clean, its surface In the second chamber, the hot, decontaminated filament is impinged upon by a gaseous, thermally decomposable metal compound in plural streams, to thermally decompose the compound and metallize the filament.

A general review of composite materials containing conductive fibers is contained in "Conductive Polymeric Composites From Short Conductive Fibers" by Bigg, D. M., et al., Polym. Sci. Technol., 15 (Conduct.

Polym.), 23–28, Battelle Columbus Laboratory, Columbus, Ohio (1981).

The techniques utilized in accordance with the above-discussed references for metallizing glass substrates are all characterizable by various deficiencies, such as inadequate adhesion of the metal coating to the glass, and/or expensive, time-consuming, or complex processing requirements.

Accordingly, it would be a significant advance in the art to provide adherent metal coatings on adhesion-resistant substrates such as glasses, ceramics, and the like, in a readily achieved, simple, and inexpensive manner, whereby the resulting metal-coated substrate is particularly useful in applications such as composite materials manufacture, where delamination-producing abrasion and shear are imposed on metal-coated reinforcing media.

With respect to the use of polysilicate, titania, or alumina interlayers employed in the present invention to provide the advantages noted in the preceding paragraph, and with reference to the preferred method of the present invention wherein a sol gel dispersion is utilized to form such interlayers, related art includes: "Sol-Gel Transition in Simple Silicates", Brinker, C. J., et al., *Journal of Non-Crystalline Solids*, 48, 1982, pp. 47–64, North Holland Publishing Company; "Glassy and Crystalline Systems From Gels: Chemical Basis and Technical Application", Dislich, H., *Journal of Non-Crystalline Solids*, 57, 1983, pp. 371–388, North Holland Publishing Company; and "Glass Formation Through Hydrolysis of $Si(OC_2H_5)_4$ With $NH_4OH$ and HCl Solution", Nogami, M., et al., *Journal of Non-Crystalline Solids*, 37, 1980, pp. 191–201, North Holland Publishing Company.

SUMMARY OF THE INVENTION

In one aspect, the present invention relates to a metal-coated substrate, wherein the improvement comprises an interlayer between the substrate and the metal coating, comprising a material selected from the group consisting of polysilicate, titania, and alumina.

In another aspect, the interlayer in the metal-coated substrate article as described above suitably may have a porous microstructure, e.g., with an average pore size of from about 20 to about 300 Angstroms.

In yet another aspect, the substrate of the metal-coated substrate article as described above may comprise a material selected from the group consisting of glasses, ceramics, and hydroxy-functionalized materials.

A further aspect of the invention relates to a material composite comprising a plurality of metal-coated fibers according to the invention as first described above, dispersed in a continuous phase matrix material, e.g., thermoplastic materials such as acrylonitrile-butadiene-styrene compositions, polyphenylene oxide/polystyrene blends, nylon, thermoplastics marketed under the name NORYL ® (General Electric Company), and the like, or thermosetting materials such as epoxies and polyimides Another aspect of the invention relates to a structural element, suitable for use in an EMI environment, formed of a material composite as described above, containing an EMI shieldingly effective amount of the metal-coated fibers in a thermoplastic continuous phase matrix material.

A still further aspect of the invention relates to a method of forming a metal coating on a substrate, comprising the improvement of forming on the substrate, before coating of the metal thereon, an interlayer comprising a material selected from the group consisting of polysilicate, titania, and alumina.

In yet another aspect, relating to the above-described method, the interlayer is formed on the substrate by the steps comprising:
 (i) applying to the substrate a sol gel dispersion comprising the material selected from the group consisting of polysilicate, titania, and alumina; and
 (ii) drying the applied sol gel dispersion.

Another aspect of the invention relates to the method as above described, wherein the sol gel dispersion is formed by the steps comprising:
 (i) hydrolyzing a tetraalkylorthosilicate to form the corresponding silanol; and
 (ii) condensing the corresponding silanol to form a polysilioate as a dispersed phase component of the sol gel dispersion.

The invention relates in a further aspect to a method as described above, wherein the sol gel dispersion comprises an alkoxide of a metal selected from the group consisting of titanium and aluminum.

A further aspect of the invention relates to a method of making a material composite, comprising the steps of:
 (i) providing a continuous phase matrix material; and
 (ii) dispersing in the continuous phase matrix material a plurality of metal-coated fibers as described hereinabove.

Other aspects, features, and advantages of the invention will be more fully apparent from the ensuing disclosure and appended claims.

BRIEF DESCRIPTION OF THE DRAWING

The single drawing is a schematic representation of a continuous process system suitable for use in making metal-coated glass substrate articles according to the present invention, and in carrying out various method aspects of the present invention.

DETAILED DESCRIPTION OF THE INVENTION, AND PREFERRED EMBODIMENTS

As used herein, the term "substrate" refers to any natural or synthetic material to which the interlayer of the invention is suitably adherent, and on which the metal coating is more strongly adhered with the interlayer than without it. Examples of such materials include glasses such as conventional silica glass and borosilicate glasses, etc., and ceramics such as mullite, alumina, silicon carbide, silicon nitride, etc.

Particularly suitable substrates are those having pendant hydroxyl functional groups on their surfaces, and/or glassy character. Such free hydroxyl groups may occur naturally in the substrate material or be provided by treating the substrate surface in any known manner to yield pendant hydroxyl groups thereon as a hydroxyl-functionalized material.

The substrate formed from the aforementioned materials may have any suitable size and shape as necessary or desirable in the given end use application for which the metal-coated substrate is intended. The substrate articles may for example be in the shape of filaments or fibers, sheets, rods, films, etc.

A particularly useful end use application for the metal-coated substrates of the invention is in material composites, especially in composites employed for structural elements in EMI shielding applications. For such usage, the substrate may advantageously be in the form of chopped or otherwise discrete fibers.

The metal coating on the substrate articles of the invention may be any suitable metal element, alloy, organometallic complex, etc., having appropriate compatibility with and adhesion to the interlayer of the present invention. Illustrative of metals which may advantageously be employed are nickel, copper, aluminum, gold, silver, platinum, palladium, tellurium, rhodium, lead, cobalt, iron, and compatible alloys and compounds thereof.

In accordance with the present invention, an interlayer, i.e., an intermediate layer, is employed between the substrate and the metal coating, to provide for enhanced adhesion of the metal coating to the substrate. This of course requires that the interlayer be of a material which itself is suitably adherent to the glass substrate as well as to the metal coating.

It has been discovered that interlayers meeting the above criteria may readily be formed, comprising a material selected from the group consisting of polysilicate, titania, and alumina.

Although Japanese Kokai Tokkyo Koho No. 60/65179, discussed in the "Background of the Invention" section hereinabove, teaches to nickel coat glass fibers by first soaking them in titanium sulfate followed by calcining to form titanium dioxide (titania) coatings, the fibers then are soaked in aqueous stannous chloride-hydrochloric acid solution, washed, activated in aqueous palladium chloride-hydrochloric acid solution to precipitate palladium on the fibers, and again washed, before the final nickel plating step.

The result is a titania-palladium interlayer, which requires three soaking steps, two washing steps, and a calcining step, so that this disclosed process is time-consuming, complex, and expensive, relative to the titania interlayer formation in the practice of the present invention. Accordingly, it is to be understood that the term "titania" used in reference to an interlayer material of the present invention means a material which is essentially completely free of palladium, and preferably having a porous microstructure.

The interlayer of the invention, comprising a polysilicate, titania, or alumina material, may have any suitable morphology consistent with the provision of good adhesion characteristics between the interlayer, and the substrate and metal coating surfaces adjacent thereto.

A particularly advantageous morphology for the interlayer comprises a porous microstructure. Such microstructure is preferred because it facilitates a mechanical interlocking of the metal coating to the interlayer, as well as enhancing adhesion of the interlayer to the substrate.

A suitable porous microstructure in the interlayer may for example have an average pore size, i.e., pore diameter, on the order of from about 20 to about 300 Angstroms, preferably from about 30 to about 250 Angstroms, and most preferably from about 50 to about 200 Angstroms. Interlayers comprising polysilicate materials, with an average pore size of from about 50 to about 150 Angstroms, are particularly usefully employed in the practice of the invention.

In addition to the polysilicate, titania, or alumina materials, the interlayers of the invention may comprise other components, as necessary or desirable for the specific glass substrate and metal coating being employed (except that, as indicated, titania-based interlayers will be essentially completely free of palladium).

Examples of such other interlayer components may include antioxidants, fillers, pigments (e g., to provide for ready visual detection of discontinuities in the metal coated thereover), desiccants, fluxes, etc However, in most applications, other such components are generally not necessary, and interlayers consisting essentially of only polysilicate, titania, or alumina will provide the desired level of good adhesion of the metal coating to the substrate, as well as good mechanical and physical properties in the metal-coated substrate article.

The interlayer may be formed on the substrate in any suitable manner, e.g., by electrolytic methods, chemical vapor deposition, etc., however it is preferred to form the interlayer on the substrate by application thereto of a sol gel dispersion of the polysilicate, titania, or alumina.

After the applied sol gel dispersion is dried, the metal coating may be formed on the interlayer-coated glass substrate in any conventional manner, such as, for example, electroplating, precipitation, electroless plating, chemical vapor deposition, etc.

For interlayers comprising a polysilicate material, as formed on the substrate from a sol gel dispersion of the polysilicate, the polysilicate may be formed from a tetraalkylorthosilicate starting material, such as tetraethylorthosilicate or tetramethylorthosilicate.

The tetraalkylorthosilicate is suitably hydrolyzed in a solven medium comprising an aqueous solution of an organic alcohol, such as a $C_1$-$C_8$ alcohol following the hydrolysis in which the tetraalkylorthosilicate reacts to form the corresponding silanol, the silanol product is condensed to form polysilicate as a dispersed phase component of the resulting sol gel dispersion.

For sol gel formation of titania or alumina interlayers, the sol gel may be formed as a dispersion of titanium alkoxide or aluminum alkoxide, repectively, in solvent solutions such as those described above in connection with polysilicate sol gel dispersions.

Once applied to the substrate, by any suitable method such as for example, dipping (tub sizing), spraying, roller coating, brushing, and the like, the sol gel dispersion is dried to remove the organic and aqueous solvents (along with any volatile products of the condensation reaction, in the case of the aforementioned polysilicate sol gel dispersion) therefrom, to yield the interlayer as a dry coating layer on the substrate.

As indicated above, the metal coating may be readily applied to the interlayer on the substrate by chemical vapor deposition from a thermally decomposable compound comprising the metal. This is highly advantageous in the case of metals, such as nickel, which form easily thermally decomposable compounds, e.g., nickel oarbonyl, which facilitate the use of chemical vapor deposition.

It will be appreciated that the thicknesses of the respective interlayer and metal coating may be varied widely and independently of one another, to provide respective layers most appropriately dimensioned to the end use application intended for the metal-coated substrate comprising the interlayer.

In applications where a metal-coated glass substrate according to the invention is employed in EMI shielding applications, it will in general be satisfactory to provide the interlayer with a thickness of from about 30 to about 2500 Angstroms, and the metal coating with a thickness of from about 0.01 to about 3.0 microns.

As an example of a specific article, nickel-coated glass fibers for EMI shielding applications may feature a nickel coating with a thickness of from about 0.1 to about 1.0 micron, with a polysilicate interlayer having a thickness of from about 100 to about 1000 Angstroms.

A preferred application for metal-coated substrate articles of the invention is as reinforcing media in material composites for EMI shielding or other structural applications. In such composites, the metal-coated substrate articles, suitably in the form of metal-coated fibers, or scrim or fabric formed therefrom, form the discontinuous phase of the composite, in a continuous phase matrix material, e.g., a thermoplastic resin in EMI shielding composites.

The art of material composites is well developed with respect to the commercial availability of a wide variety of matrix materials useful therefor, and any suitable matrix materials of such type may potentially be used in the broad practice of the present invention.

For the making of the material composites according to the present invention, a continuous phase matrix material is provided, and a plurality of the metal-coated substrate articles, e.g., metal-coated glass or ceramic fibers, are dispersed therein.

Structural elements, suitable for use in an EMI environment, may be formed of such material composites, which contain an EMI shieldingly effective amount of the metal-coated substrate articles.

As used in such context, "an EMI shieldingly effective amount" refers to the amount of metal-coated substrate articles in the composite which provides a predetermined necessary or desirable level of electromagnetic interference attenuation, when the structural element is employed in an EMI environment for such purpose.

Referring now to the drawing, there is shown a schematic representation of a continuous process system suitable for use in making metal-coated glass fibers according to the present invention, and in carrying out various method aspects of the present invention.

The process system of this drawing is more fully described in copending application Ser. No. 913,000, now U.S. Pat. No. 4,759,950, patented July 26, 1988, filed concurrently herewith in the name of Ward C. Stevens, and entitled "Apparatus and Method for Metallizing Filaments".

As shown, glass filament 10, from a source 12 of same, enters the system and passes into the desizing furnace 14 provided with an inlet seal 16 and an outlet seal 18, through which the filament is respectively drawn.

In the desizing furnace, the filament is subjected to elevated temperature conditions below the melting point of the glass, but sufficiently high to degass the filament surface and remove any sizing (e.g., starches, thin film epoxies, waxes, or polymeric protective coatings) therefrom.

Compressed air from a source tank 5 is flowed into the desizing furnace through control valve 6 and conduit 7. In the furnace, this introduced gas circulates in contact with the filament to remove volatile components therefrom. The resulting volatiles-containing air is discharged from the furnace in effluent conduit 15

Upon exiting the furnace, the desized glass filament 20 is conveyed, by means of synchronously rotated rollers 22, 24, and 26, through vessel 28 containing therein a volume of a sol gel dispersion of a polysilicate, titania, or alumina material, so that the glass filament is dip coated with the sol gel dispersion. The sol gel dispersion may comprise an aqueous solution of ethanol as the solvent component thereof.

The dispersion-coated filament 32 thereupon enters the dehydration furnace 34, equipped with inlet seal 36 and exit seal 38. Compressed air, from source tank 42, is flowed through flow control valve 43 and conduit 44 into the dehydration furnace, where it circulates in contact with the filament to remove volatile components from the applied dispersion. The resulting volatiles-containing air is discharged from the furnace in effluent conduit 40.

The dried sol gel coating has a porous microstructure, and the temperature and drying conditions in the furnace may be judiciously selected to partially collapse the pores of the coating to control its hardness and other physical and performance properties. Thus, temperatures sufficiently high to cause microstructural changes such as pore collapse can be achieved in the dehydration furnace to tailor the morphology of the interlayer so that an adherent and scratch-resistant coating is achieved.

The drying and heat treatment of the sol gel dispersion in the dehydration furnace provides the interlayer on the filament. This filament passes in transfer conduit 46 into the metal coating chamber 48 in which a nickel coating is applied to the interlayer-coated filament.

The resulting nickel-coated glass filament is discharged from the metal coating chamber in transfer conduit 50 as product filament 52 and is passed to the collection means 54.

In the metal coating chamber, the filament while still at elevated temperature from the dehydration furnace, is impinged with a gaseous stream of nickel carbonyl, which causes this gaseous compound to thermally decompose and elemental nickel to deposit on the interlayer-coated substrate.

The nickel carbonyl source gas is generated in vessel 76 containing a fluidized bed of nickel granules 78. The bed is fluidized with a gas comprising carbon monoxide furnished from cylinder 70, and flowed therefrom through flow control valve 72 and conduit 74 into the lower end of vessel 76.

In the fluidized bed, the carbon monoxide reacts with the granular nickel to form gaseous nickel carbonyl, which is flowed in discharge conduit 80 into the metal coating chamber 48. Subsequent to its decomposition in the chamber, the nickel-depleted gas is discharged from the chamber in effluent conduit 66, with a portion thereof being recirculated in recycle conduit 68 to join with the carbon monoxide from cylinder 70 to form the fluidizing gas.

Because nickel carbonyl is toxic in character, an inert gas curtain is provided at each end of the metal coating chamber 48. Inert gas, e.g., nitrogen, is flowed from a source cylinder 56 through flow control valve 58 into gas manifold conduit 60, from which the gas is introduced in branch lines 62 and 64 into the transfer conduits 46 and 50, respectively. In such manner, the metal coating chamber is pressure-balanced at its extremities by the inert gas so no net efflux of nickel carbonyl from the chamber to the external environment takes place.

It will be appreciated that the gas discharged in effluent conduit 66, containing carbon monoxide and minor amounts of nickel carbonyl, may advantageously be passed to solvent washing or other treatment steps, to effect the recovery of the nickel content of this stream and the carbon monoxide component thereof, for reuse in the system.

The sol gel-derived interlayer coatings in accordance with the present invention are strongly adherent to glass or ceramic substrates as a result of bonding interaction between hydroxyl functional groups on the substrate surface and esters and/or metalorganics in the sol. By proper choice of pH of the sol, the porosity of the interlayer coating, as dried, can be varied. The drying and heat treatment conditions may also be varied to vary the porosity of the interlayer. The porosity of the interlayer is readily determined by standard porosimetry techniques, so that one of ordinary skill may easily determine the sol pH, drying and heat treatment conditions necessary to obtain a desired porosity, without undue experimentation.

When the interlayer-coated substrate is coated with metal, the metal penetrates into the pores of the interlayer to provide a high degree of mechanical interlocking between the metal coating and the interlayer, while concurrently, chemical bonds between the interlayer material and the substrate provide good adhesion of the interlayer to the substrate.

It is within the purview of the present invention to modify the chemical composition of the sol gel dispersion to provide covalent or associative bonding of the metal coating to the interlayer, or to provide for enhanced infrared or microwave radiation absorption by the interlayer, as a means of heating the substrate to facilitate drying of the applied sol gel dispersion, and the decomposition of a gaseous metal compound, if chemical vapor deposition is employed to apply the metal coating to the interlayer.

The features and embodiments of the invention are more fully shown hereinafter with reference to the following non-limiting examples.

EXAMPLE I

Following the procedure generally disclosed in Nogami, et al., *J. Non-Cryst. Solids*, 37, 1980, pp 191–201 for glass formation by the hydrolysis of tetraethylorthosilicate with ammonium hydroxide, samples were prepared by mixing 10 moles of water with 1 mole of tetraethylorthosilicate and 0.15M ammonium hydroxide. This solution was allowed to gel.

TEM examination of the gel showed particles of approximately 200 Angstroms diameter, with pores ranging from 20 to 100 Angstroms. TEM examination of a corresponding glass formed from this gel, after heating to 1000 degrees C., still showed particles having a diameter of almost 200 Angstroms.

EXAMPLE II

In order to evaluate the efficacy of interlayers for enhancement of adhesion and to test a suitable process for metal plating, baseline experiments were conducted based on the teachings of Schladitz U.S. Pat. No. 4,097,624. No attempt was made to duplicate the specific apparatus described in this patent, but conditions disclosed therein for nickel carbonyl decomposition and nickel plating were found to be useful.

An apparatus was assembled comprising three chambers, a first bubbler chamber immersed in an ice water bath, a second chemical vapor deposition (CVD) chamber wrapped with heating tape to maintain a temperature of 146 degrees C. therein, and a third sorubbing chamber comprising a copper conduit wrapped with heating tape to maintain a temperature of approximately 190 degrees C. therein and positioned with its outlet end submerged in a mineral oil bath. The second CVD chamber contained a glass rod plating substrate, a portion of which was abraded to simulate a roughened surface.

The three chambers were joined in gas flow communication with one another, and the first chamber was in turn joined to a source vessel of nitrogen and a source vessel of nickel carbonyl in carbon monoxide at 1 atm. pressure, feeding independently into a common inlet conduit to the first chamber.

The entire system was first flushed with nitrogen for a period of approximately one hour prior to filling the bubbler in the first chamber with nickel carbonyl. During the flushing step, the second and third chambers were heated to 146 degrees C. and 190 degrees C., respectively.

Approximately 0.1 ml. of the gaseous nickel carbonyl was transferred to the bubbler, and the associated source vessel then was closed. Nitrogen was introduced from its source vessel to the bubbler, for use as a carrier gas for the nickel carbonyl gas already fed into the system. After approximately two minutes no nickel carbonyl remained in the system.

Nitrogen flow then was allowed to continue, to purge the system. After about 45 minutes, the heaters were turned off and the CVD chamber was inspected. A bright nickel film was found to be deposited uniformly along the length of the CVD chamber, and on the glass rod in the chamber.

As viewed under a stereomicroscope (40× magnification), nickel was found to be plated on both abraded and unabraded portions of the glass rod. On both surface portions, the deposited nickel had a grainy appearance. With some force, the nickel coating could be removed from the unabraded portion, but could not be removed from the abraded portion, which had been prepared by rubbing the rod portion with a 220 grit sand paper.

These observations show that adhesion to glass fiber can be promoted by mechanically interlocking the metal coating to the glass fiber

EXAMPLE III

In Brinker et al., *J. Non-Cryst. Solids*, 48, 1982, pp. 47–64, methods are described for making gels which result in various microstructures, using a two-step hydrolysis procedure in which relative rates of hydrolysis and condensation are varied. Microstructure development by these methods is related to gel formation which depends on (1) hydrolysis of alkoxide groups to form silanols, (2) condensation of silanols to form silicate polymers, and (3) linking of polymers to form gels.

The relative rates of these steps (1)–(3) depend on the concentration of water and the tetraalkylorthosilicate in the reaction system, and the pH of the reaction volume.

Sample C was prepared according to the formulation set out in Table I below, to duplicate sample A3 described in the Brinker, et al. article.

TABLE I

| Component | Sample C Concentration mole % |
|---|---|
| tetraethylorthosilicate | 6.1 |
| water | 75.5 |
| n-propanol | 18.4 |

TABLE I-continued

Sample C

| Component | Concentration mole % |
|---|---|
| HCl | 0.005 |

Following the procedure in the grinker, et al. article, the silicate starting material, alcohol, water, and acid were initially mixed in the mole ratio of 1:3:1:0.0007, as a mixture of 22 gm propanol, 22.4 gm silicate, 1.9 gm water, and 0.0026 gm acid.

This initial mixture was stirred for 1.5 hour at approximately 60 degrees C. 16.5 ml of water was added and the mixture was stirred at room temperature for approximately 5 hours.

A glass rod was dipped in the resulting sol. The wetting appeared good, and the coated rod was dried overnight at 200 degrees C.

When the coated glass rod was removed from the oven, interference colors were observed toward the top portion of the rod. Examination under a stereomicroscope at 40× revealed the lower portion of the rod to have a cracked film which was non-adherent. The upper rod portion, however, showed an adherent and scratch-resistant (when scratched with metal forceps) film. These observations were due to the fact that the coated rod was dried in a vertical position, and in spite of the low viscosity of the sol the coating was significantly thicker on the lower portion of the rod than on the upper portion thereof. The consequently larger shrinkage stresses on the lower portion of the rod caused the coating to be poorly adherent.

The coated rod, along with some Pyrex® glass wool, sliver 8 micron, was placed in a 6 mm Pyrex® tube for metal coating. The coating apparatus described in Example III was employed for the metallization of the rod, modified with the addition of a temperature controller to regulate the temperature in the coating chamber, and with the addition of nitrogen to the nickel carbonyl/nitrogen stream to dilute the metal compound.

The metal coating chamber was maintained at 145 degrees C. The entire assembly was purged with nitrogen only, for about 45 minutes, and nitrogen gas flow was then discontinued. Approximately 0.1–0.2 ml of nickel carbonyl then was introduced to the system, and nitrogen flow was resumed. Nickel carbonyl was evaporated in about 45 seconds, during which time the temperature in the metal coating chamber dropped by about 5 degrees C.

Nitrogen flow was continued in the system for 0.5 hour, and then the system heaters were turned off. After 2 hours, the metal coating chamber was disassembled and its contents examined.

Study of the glass rod under the microscope showed nickel deposition to be the same on sol gel coated, as well as uncoated, areas. More force was required to remove the nickel film from the sol gel coated glass substrate, than from the portions of the glass substrate containing no sol gel coating. The mechanism of nickel removal by scratching (using a metal forceps as the scratching implement) appeared to be different in the sol gel coated, and non-coated areas; on the sol coated areas, complete removal of the nickel film from the glass substrate appeared to require the removal of the sol coating as well, whereas on the non-coated areas (bare glass without sol gel coating) the nickel film readily peeled away on scratching.

This example shows the effective of sol gel films in enhancing the adhesion of metal coatings on glass substrates in the manner of the present invention.

While preferred and illustrative embodiments of the invention have been described, it will be appreciated that numerous modifications, variations, and other embodiments are possible, and accordingly, all such apparent modifications, variations, and embodiments are to be regarded as being within the spirit and scope of the invention.

What is claimed is:

1. A method of forming a metal coating on a substrate, comprising the steps of:
   (a) applying to said substrate a sol gel dispersion of a material selected from the group consisting of polysilicate, titania, and alumina;
   (b) drying the applied sol gel dispersion to form a porous microstructure interlayer on the substrate, under selected temperature and drying conditions to partially collapse the pores of the microstructure and provide the interlayer with an average pore size of between about 20 and about 300 Angstroms and render it adherent to the substrate and scratch-resistant in character, with the interlayer having a thickness of from about 30 to about 2500 Angstroms; and
   (c) applying to the interlayer formed on the substrate a metal coating of from about 0.01 to about 3.0 microns thickness.

2. A method according to claim 1, wherein the sol gel dispersion is formed by the steps comprising:
   (i) hydrolyzing a tetraalkylorthosilicate to form the corresponding silanol; and
   (ii) condensing the corresponding silanol to form a polysilicate as a dispersed phase component of the sol gel dispersion.

3. A method according to claim 1, wherein the sol gel dispersion comprises an alkoxide of a metal selected from the group consisting of titanium and aluminum.

4. A method according to claim 1, wherein the metal coating is applied by chemical vapor deposition from a thermally decomposable compound comprising the metal.

5. A method according to claim 1, wherein the substrate comprises a material selected from the group consisting of glasses, ceramics, and hydroxy-functionalized materials.

6. A method according to claim 1, wherein the substrate consists essentially of a material selected from the group consisting of glasses, ceramics, and hydroxy-functionalized materials.

7. A method according to claim 1, wherein the substrate is a fiber.

8. A method of making a material composite, comprising the steps of:
   (i) providing a continuous phrase matrix material; and
   (ii) dispersing in the continuous phrase matrix material a plurality of metal-coated fibers formed according to the method of claim 7.

9. A method according to claim 1, wherein the metal coating is nickel and the sol gel dispersion comprises a polysilicate material.

10. A method according to claim 2, wherein the hydrolysis of step (i) is carried out in a solvent medium comprising an aqueous solution of an organic alcohol.

11. A method according to claim 10, wherein the organic alcohol is a $C_1$–$C_8$ alcohol.

12. A method according to claim 2, wherein the tetraalkylorthosilicate is tetraethylorthoislicate.

13. A method according to claim 4, wherein the thermally decomposable compound is nickel carbonyl.

14. A method according to claim 5, wherein the substrate comprises a ceramic selected from the group consisting of mullite, alumina, silicon carbide, and silicon dioxide.

15. A method according to claim 8, wherein the continuous phase matrix material is a thermoset composition selected from the group consisting of epoxides and polyimides.

16. A method according to claim 8, wherein the continous phase matrix material is a thermoplastic selected from the group consisting of acrylonitrile-butadiene-styrene compositions, polyphenylene oxide/polystyrene blends, and nylon.

* * * * *